United States Patent
Williamson (10) Patent No.: US 10,353,891 B2
(45) Date of Patent: Jul. 16, 2019

(54) INTERPOLATING CONFORMAL INPUT SETS BASED ON A TARGET OUTPUT

(75) Inventor: Eric Williamson, Willow Spring, NC (US)

(73) Assignee: Red Hat, Inc., Raleigh, NC (US)

( * ) Notice: Subject to any disclaimer, the term of this patent is extended or adjusted under 35 U.S.C. 154(b) by 420 days.

(21) Appl. No.: 12/872,779

(22) Filed: Aug. 31, 2010

(65) Prior Publication Data

US 2012/0054212 A1 Mar. 1, 2012

(51) Int. Cl.
*G06F 17/30* (2006.01)
*G06F 16/245* (2019.01)
*G06F 16/242* (2019.01)

(52) U.S. Cl.
CPC ........ *G06F 16/245* (2019.01); *G06F 16/2423* (2019.01)

(58) Field of Classification Search
CPC .................... G06F 16/245; G06F 16/2423
See application file for complete search history.

(56) References Cited

U.S. PATENT DOCUMENTS

| | | | |
|---|---|---|---|
| 5,884,324 A * | 3/1999 | Cheng et al. | |
| 5,890,167 A | 3/1999 | Bridge, Jr. et al. | |
| 5,978,796 A | 11/1999 | Malloy et al. | |
| 6,360,188 B1 | 3/2002 | Freidman et al. | |
| 6,366,922 B1 | 4/2002 | Althoff | |
| 6,434,435 B1 | 8/2002 | Tubel et al. | |
| 6,434,544 B1 | 8/2002 | Bakalash et al. | |
| 6,594,672 B1 | 7/2003 | Lampson et al. | |
| 6,609,123 B1 | 8/2003 | Cazemier et al. | |
| 6,735,590 B1 | 5/2004 | Shoup et al. | |
| 6,931,418 B1 | 8/2005 | Barnes | |
| 7,152,062 B1 | 12/2006 | Draper et al. | |
| 7,299,241 B2 | 11/2007 | Reed et al. | |
| 7,660,822 B1 | 2/2010 | Pfleger | |
| 2001/0049678 A1 | 12/2001 | Yaginuma | |
| 2002/0029207 A1 | 3/2002 | Bakalash et al. | |
| 2002/0036562 A1 | 3/2002 | Roller et al. | |
| 2002/0083034 A1 | 6/2002 | Orbanes et al. | |

(Continued)

OTHER PUBLICATIONS

Nielson, G.W., Scattered Data Modeling, IEEE Computer Graphics and Applications, vol. 13, No. 1 (Jan. 1993), pp. 60-70.*

(Continued)

*Primary Examiner* — Tyler J Torgrimson
(74) *Attorney, Agent, or Firm* — Lowenstein Sandler LLP (57) ABSTRACT

Embodiments relate to systems and methods for interpolating conformal input sets based on a target output. A database management system can store sets of operational data, such as financial, medical, climate or other information. A user can input or access a set of target data, representing an output which a user wishes to be generated from an interpolated set of input data based on an interpolation function. Thus, the average air temperature of a region may be known for the last ten years, along with various inputs including water temperature, wind speed, and other climate data. The target data can include an expected average temperature for the current year. The interpolation engine can receive the target temperature for the current year, and generate those water temperatures, wind speeds, and other input variables that will produce the target output temperature.

15 Claims, 5 Drawing Sheets

(56) References Cited

U.S. PATENT DOCUMENTS

| | | |
|---|---|---|
| 2002/0087516 A1 | 7/2002 | Cras et al. |
| 2002/0169658 A1 | 11/2002 | Adler |
| 2003/0114950 A1 | 6/2003 | Ruth et al. |
| 2003/0115194 A1 | 6/2003 | Pitts et al. |
| 2003/0115207 A1 | 6/2003 | Bowman et al. |
| 2003/0120372 A1 | 6/2003 | Ruth et al. |
| 2003/0126114 A1 | 7/2003 | Tedesco |
| 2003/0184585 A1 | 10/2003 | Lin et al. |
| 2003/0225736 A1 | 12/2003 | Bakalash et al. |
| 2004/0039736 A1 | 2/2004 | Kilmer et al. |
| 2004/0133552 A1 | 7/2004 | Greenfield et al. |
| 2004/0139061 A1 | 7/2004 | Colossi et al. |
| 2005/0004904 A1 | 1/2005 | Kearney et al. |
| 2005/0010566 A1 | 1/2005 | Cushing et al. |
| 2005/0060362 A1 | 3/2005 | Spector et al. |
| 2006/0004833 A1 | 1/2006 | Trivedi et al. |
| 2006/0036707 A1 | 2/2006 | Singh et al. |
| 2006/0136462 A1 | 6/2006 | Campos et al. |
| 2006/0262145 A1 | 11/2006 | Zhang et al. |
| 2007/0022093 A1 | 1/2007 | Wyatt et al. |
| 2007/0027904 A1 | 2/2007 | Chow et al. |
| 2007/0088757 A1 | 4/2007 | Mullins et al. |
| 2007/0094236 A1 | 4/2007 | Otter et al. |
| 2007/0208721 A1 | 9/2007 | Zaman et al. |
| 2008/0140696 A1 | 6/2008 | Mathuria |
| 2008/0172405 A1 | 7/2008 | Fang et al. |
| 2008/0243778 A1 | 10/2008 | Behnen et al. |
| 2008/0294596 A1 | 11/2008 | Xiong |
| 2008/0320023 A1 | 12/2008 | Fong |
| 2009/0193039 A1 | 7/2009 | Bradley et al. |
| 2009/0222470 A1 | 9/2009 | Kemp et al. |
| 2009/0248490 A1* | 10/2009 | Moncreiff .................. 705/10 |
| 2010/0057700 A1 | 3/2010 | Williamson |
| 2010/0057777 A1 | 3/2010 | Williamson |
| 2010/0131456 A1 | 5/2010 | Williamson |
| 2010/0149917 A1* | 6/2010 | Imhof et al. ................. 367/53 |
| 2010/0169299 A1 | 7/2010 | Pollara |
| 2010/0305922 A1 | 12/2010 | Williamson |
| 2010/0306254 A1 | 12/2010 | Williamson |
| 2010/0306255 A1 | 12/2010 | Williamson |
| 2010/0306272 A1 | 12/2010 | Williamson |
| 2010/0306281 A1 | 12/2010 | Williamson |
| 2010/0306340 A1 | 12/2010 | Williamson |
| 2010/0306682 A1 | 12/2010 | Williamson |
| 2011/0050728 A1 | 3/2011 | Williamson |
| 2011/0054854 A1 | 3/2011 | Williamson |
| 2011/0055680 A1 | 3/2011 | Williamson |
| 2011/0055761 A1 | 3/2011 | Williamson |
| 2011/0055850 A1 | 3/2011 | Williamson |
| 2011/0078199 A1 | 3/2011 | Williamson |
| 2011/0078200 A1 | 3/2011 | Williamson |
| 2011/0131176 A1 | 6/2011 | Williamson |
| 2011/0131220 A1 | 6/2011 | Williamson |
| 2011/0158106 A1 | 6/2011 | Williamson |
| 2011/0161282 A1 | 6/2011 | Williamson |
| 2011/0161374 A1 | 6/2011 | Williamson |
| 2011/0161378 A1 | 6/2011 | Williamson |

OTHER PUBLICATIONS

Wu, et al. An effective method for 3d geological modeling with multi-source data integration. Computers & Geosciences vol. 31 Issue 1 Feb. 2005 [retrieved on Aug. 7, 2012]. Retrieved from the Internet: <URL: http://www.sciencedirect.com/science/article/pii/S0098300404001505> p. 35-43.*

Charles Dyer, An Elementary Introduction to Scientific Computing, Higher Order Polynomial Interpolation [online]. Apr. 24, 2002 [retrieved on Feb. 28, 2013]. Retrieved from the Internet: <URL: http://pathfinder.scar.utoronto.ca/~dyer/csca57/book_P/node30.html>.*

Tremblay et al., Interpolation of animal tracking data in a fluid environment, The Journal of Experimental Biology 209, 128-140, Published by the Company of Biologists 2006, published Jan. 1, 2006, retrieved on Jul. 16, 2013, retrieved from the Internet at <URL: http://jeb.biologists.org/content/209/1/128.full.pdf+html>.*

Wu, et al. An effective method for 3d geological modeling with multi-source data integration. Computers & Geosciences vol. 31 Issue 1 Feb. 2005 [retrieved on Aug. 7, 2012]. Retrieved from the Internet: <URL: http://www.sciencedirect.com/science/article/pii/S0098300404001505>.*

Wu et al., An effective method for 3d geological modeling with multi-source data integration, Computers & Geosciences vol. 31 Issue 1 Feb. 2005 pp. 35-43 retrieved on Aug. 7, 2012, retrieved from the Internet: <URL: http://www.sciencedirect.com/science/article/pii/S0098300404001505>.*

Interpolation/Extrapolation, publication date of at least Oct. 10, 2000, retrieved on May 16, 2015, retrieved from the Internet: <URL: https://web.archive.org/web/20001010162422/http://earth.usc.edu/~slund/tsa/interpolation.html>.*

Using OLAP and Multi-Dimensional data for decision making, Hasan et al. IEEE 2001.

A new OLAP aggregation based on the AHC technique, Massaoud et al, DOLAP'04 Nov. 12-13, 2004.

Interactive hierarchical dimension ordering, spacing and filtering for exploration of high dimension datasets, Yang et al, IEEE symposium on information visualization 2003.

Williamson, "Systems and Methods for Validating Interpolation Results Using Monte Carlo Simulations on Interpolated Data Inputs", U.S. Appl. No. 13/037,344, filed Feb. 28, 2011.

Williamson, "Systems and Methods for Interpolating Alternative Input Sets Based on User Weighted Variables", U.S. Appl. No. 12/951,881, filed Nov. 22, 2010.

Williamson, "Systems and Methods for Tracking Differential Changes in Conformal Data Input Sets". U.S. Appl. No. 12/951,937, filed Nov. 22, 2010.

Williamson, "Systems and Methods for Training a Self-Learning Network Using Interpolated Input Sets Based on a Target Output", U.S. Appl. No. 12/872,935, filed Aug. 31, 2010.

Wiillamson, "Systems and Methods for Embedding Interpolated Data Object in Application Data File", U.S. Appl. No. 12/955,717, filed Nov. 29, 2010.

Williamson, "Systems and Methods for Generating Interpolated Input Data Sets Using Reduced Input Source Objects", U.S. Appl. No. 12/955,768, filed Nov. 29, 2010.

Williamson, "Systems and Methods for Filtering Interpolated Input Data Based on User-Supplied or Other Approximation Constraints", U.S. Appl. No. 12/955,790, filed Nov. 29, 2010.

Williamson, "Systems and Methods for Binding Multiple Interpolated Data Objects", U.S. Appl. No. 12/955,811, filed Nov. 29, 2010.

Williamson, "Systems and Methods for Generating Portable Interpolated Data Using Object Based Encodig of Interpolated Results", U.S. Appl. No. 13/037,322, filed Feb. 28, 2011.

Williamson, "Systems and Methods for Generating Interpolation Data Template to Normalize Analytic Runs", U.S. Appl. No. 13/037,332, filed Feb. 28, 2011.

Williamson, "Systems and Methods for Generating Interpolation Data Sets Converging to Optimized Results Using Iterative Overlapping Inputs", U.S. Appl. No. 13/037,341, filed Feb. 28, 2011.

ASFAQ.com, "What are the valid styles for converting datetime to string?", (2006) http://database.aspfaq.com/database/what-are-the-valid-styles-for-converting-datetime-to-string.html.

Answering Joint Queries from Multiple Aggregate OLAP Databases,, Pourabbas et al, LNCS 2737 pp. 24-34, 2003.

* cited by examiner

INTERPOLATING CONFORMAL INPUT SETS BASED ON A TARGET OUTPUT

FIELD

The invention relates generally to systems and methods for interpolating conformal input sets based on a target output, and more particularly, to platforms and techniques for receiving target output data and generating one or more sets of input data that will produce the target output data under constrained conditions.

BACKGROUND

In the fields of computational modeling and high performance computing, modeling platforms are known which contain a modeling engine to receive a variety of modeling inputs, and then generate a precise modeled output based on those inputs. In conventional modeling platforms, the set of inputs are precisely known, and the function applied to the modeling inputs is precisely known, but the ultimate results produced by the modeling engine are not known until the input data is supplied and the modeling engine is run. For example, in an econometric modeling platform, inputs for a particular industry like housing can be fed into a modeling engine. Those inputs can include, for instance, prevailing finance rates, employment rates, average new-home costs, costs of building materials, rate of inflation, and other economic or other variables that can be fed into the modeling engine which is programmed or configured to accept those inputs, apply a function or other processing to those inputs, and generate an output such as projected new-home sales for a given period of time. Those results can then be used to analyze or forecast other details related to the subject industry, such as predicted sector profits or employment.

In many real-life analytic applications, however, the necessary inputs for a given subject or study may not be known, while, at the same time, a desired or target output may be known or estimated with some accuracy. For instance, the research and development (R&D) department of a given corporation may be fixed at the beginning of a year or other budget cycle, but the assignment or allocation of that available amount of funds to different research teams or product areas may not be specified by managers or others. In such a case, an analyst may have to manually estimate and "back out" distributions of budget funds to different departments to begin to work out a set of component funding amounts that will, when combined, produce the already-known overall R&D or other budget. In performing that interpolation, the analyst may or may not be in possession of some departmental component budgets which have themselves also been fixed, or may or may not be in possession of the computation function which will appropriately sum or combine all component funds to produce the overall predetermined target budget. Adjustment of one component amount by hand may cause or suggest changes in other components in a ripple effect, which the analyst will then have to examine or account for in a further iteration of the same manual estimates. It may be desirable to provide systems and methods for interpolating conformal input sets based on a target output, in which a user can access or specify a desired or predetermined target output in an analytic system, provide a partial set or subset of the inputs to the system, and have the system itself generate a set or series of sets of interpolated inputs which will conformally generate the desired output, on an automated or user-assisted basis.

DESCRIPTION

Embodiments relate to systems and methods for interpolating conformal input sets based on a target output. More particularly, embodiments relate to platforms and techniques for accessing a set of historical, operational, archival, or other operative data related to captured technical, financial, medical, or other operations, and supplying that operative data to an interpolation engine or platform. In addition, the interpolation engine can be supplied with or can access a set of target output data, for purposes of generating a set of estimated, approximated, inferred, or otherwise interpolated inputs that can be supplied to the interpolation engine to produce the target output. Thus, for instance, in an illustrative context of a climate modeling platform, a collection or set of historical input data, such as ocean temperatures, air temperatures, land temperatures, average wind speed and direction, average cloud cover, and/or other inputs or factors can be accessed or retrieved from a data store. The data store can for instance include records of those or other variables for each year of the last ten years, along with an output or result associated with those inputs, such as ocean level or polar cap area for each of those years or other series. In aspects, a partial set or subset of predetermined or fixed values for the same inputs can be supplied to the interpolation engine, such as predicted or assumed arctic temperatures, for the current year. The interpolation engine can also receive a set of target output data, such as the expected or projected ocean level or polar cap area for the current year. According to embodiments, the interpolation engine can then generate an interpolation function, and generate a set of interpolated inputs, such as air temperature, land temperature, average wind speed and direction, average cloud cover, and/or other remaining inputs whose values are unspecified, but which can be interpolated to produce values which when supplied as input to the interpolation engine can produce the set of target output data. In cases, the interpolation engine can generate different combinations of the set of interpolated input data in different generations or series, to permit an analyst or other user to manipulate the input values, to observe different ramifications of different component values for the set of interpolated inputs. The user can be presented with a selector dialog or other interface to manipulate the set of interpolated input values, and select or adjust those values and/or the interpolation function used to generate those values. The analyst or other user can thereby determine scenarios and potential inputs that will combine to realize the desired solution in the form of the set of target output data, and the values conformally producing that output can be varied or optimized. The ability to analyze and derive input sets that will produce already-know or fixed output can thereby be automated in whole or part, permitting a user to investigate a broader array of analytic scenarios more efficiently and effectively.

Figure 1:
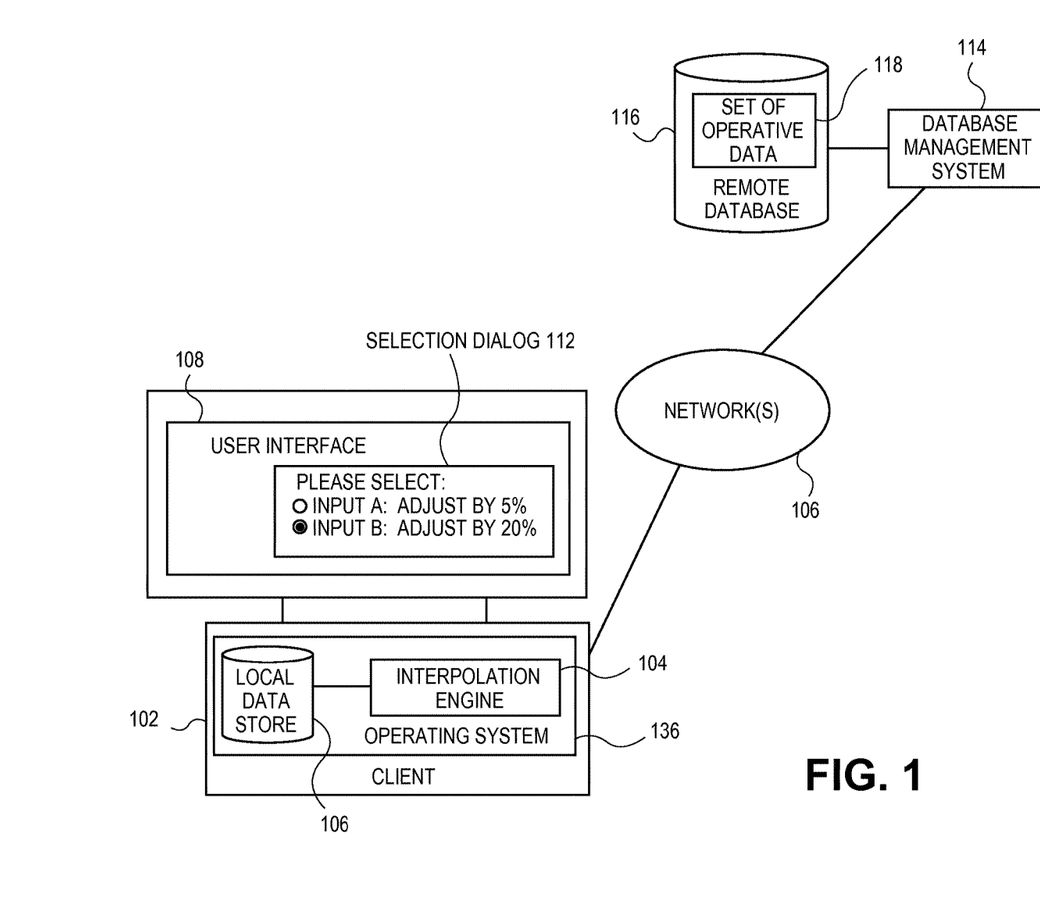
FIG. 1 illustrates an overall network architecture in which systems and methods for interpolating conformal input sets based on a target output can be practiced, according to various embodiments of the present teachings.

In embodiments as shown in FIG. 1, in accordance with embodiments of the invention, a user can operate a client 102 which is configured to host an interpolation engine 104, to perform interpolation and other analytic operations as described herein. In aspects, while embodiments are described in which interpolation engine 104 is described to operate on historical data to interpolate or fill in missing values or parameters, in embodiments, it will be understood that interpolation engine 104 can in addition or instead operate to produce extrapolated data, reflected expected future values of inputs and/or outputs. In aspects, the client 102 can be or include a personal computer such as a desktop or laptop computer, a network-enabled cellular telephone, a network-enabled media player, a personal digital assistant, and/or other machine, platform, computer, and/or device. In aspects, the client 102 can be or include a virtual machine, such as an instance of a virtual computer hosted in a cloud computing environment. In embodiments as shown, the client 102 can host or operate an operating system 136, and can host or access a local data store 106, such as a local hard disk, optical or solid state disk, and/or other storage. The client 102 can generate and present a user interface 108 to an analyst or other user of the client 102, which can be a graphical user interface hosted or presented by the operating system 136. In aspects, the interpolation engine 104 can generate a selection dialog 112 to the user via the user interface 108, to present the user with information and selections related to interpolation and other analytic operations.

In embodiments as likewise shown, the client 102 and/or interpolation, engine 104 can communicate with a remote database management system 114 via one or more networks 106. The one or more networks 106 can be or include the Internet, and/or other public or private networks. The database management system 114 can host, access, and/or be associated with a remote database 116 which hosts a set of operative data 118. In aspects, the database management system 114 and/or remote database 118 can be or include remote database platforms such the commercially available Oracle™ database, an SQL (structured query language) database, an XML (extensible markup language) database, and/or other storage and data management platforms or services. In embodiments, the connection between client 102 and/or the interpolation engine 104 and the database management system 114 and associated remote database 116 can be a secure connection, such as an SSL (secure socket layer) connection, and/or other connection or channel. The interpolation engine 104 can access the set of operative data 118 via the database management system 114 and/or the remote database 116 to operate, analyze, interpolate and map the set of operative data 118 and other data sets to produce or conform to a set of target output data 120. In aspects, the predetermined or already-known set of target output data 120 can be stored in set of operative data 118, can be received as input from the user via selection dialog 112, and/or can be accessed or retrieved from other sources.

Figure 2A:
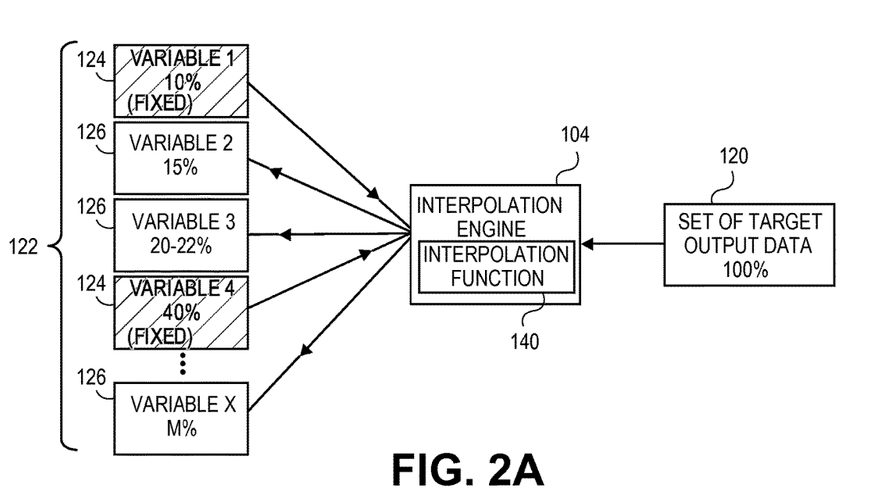
FIGS. 2A-2C illustrate various exemplary sets of input data, and series of sets of input data, that can be used in or produced by systems and methods for interpolating conformal input sets based on a target output, according to various embodiments.
Figure 2B:
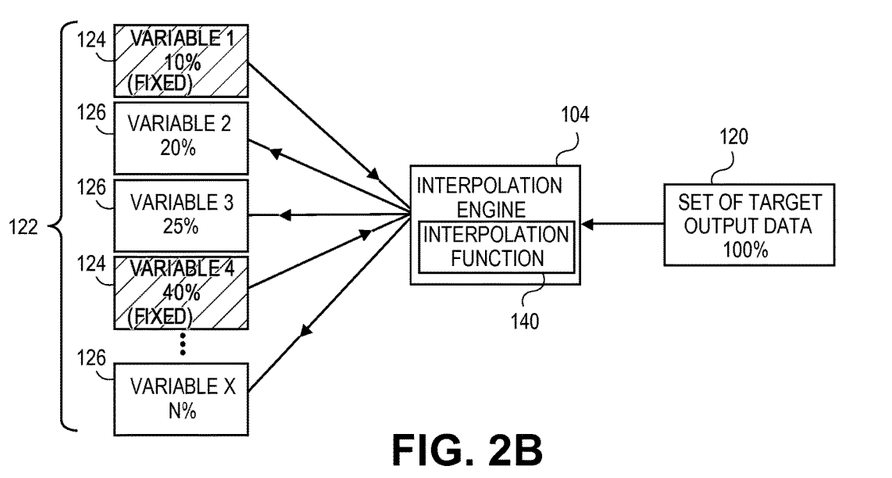
Figure 2C:
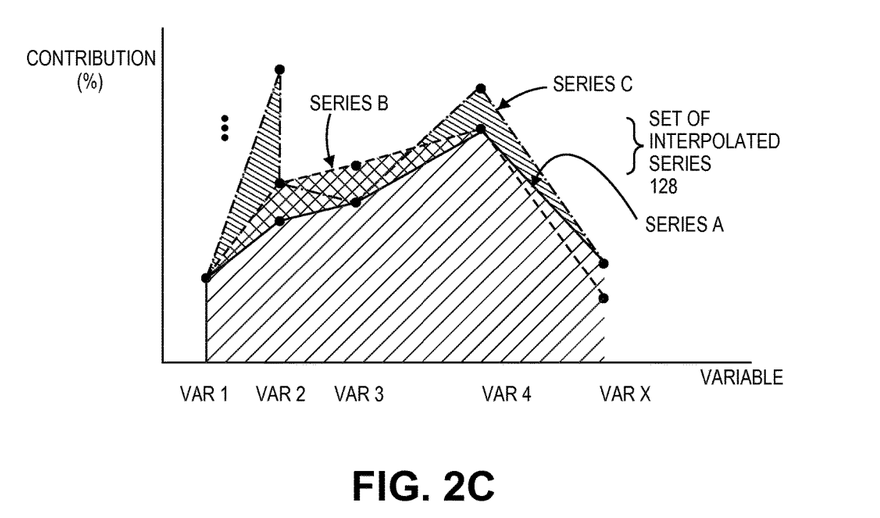

In embodiments, and as shown in FIGS. 2A-2C, the interpolation engine 104 can, in general, receive the set of target output data 120, and operate on that data to produce a conformal mapping of a set of combined input data 122 to generate an output of the desired set of target output data. As for instance shown in FIG. 2A, the set of combined input data 122 can, in cases, comprise at least two component input data sets or subsets. In aspects as shown, the set of combined input data 122 can comprise or contain a set of predetermined input data 124. The set of predetermined input data 124 can consist of data that is predetermined or already known or captured, for instance by accessing the set of operative data 118, and/or by receiving that data from the user as input via the selection dialog 112. In aspects, the set of predetermined input data 124 can include variables or other data which are already known to the user, to other parties, or has already been fixed or captured. In the case of a medical epidemiology study, for example, the set of predetermined input data 124 can include the number of vaccination doses available to treat an influenza or other infectious agent. For further example, in cases where the set of combined input data 122 represents the components of a corporate or government financial budget, the set of predetermined input data 124 can reflect the percentages (as for instance shown), for example to be allocated to different departments or agencies. It will be appreciated that other percentages, contributions, expressions, and/or scenarios or applications can be used.

In aspects, the interpolation engine 104 can access and process the set of predetermined input data 124 and the set of target output data 120, to generate a set of interpolated input data 126 which can produce the set of target output data 120 via an interpolation function 104. For instance, if the set of target output data 120 represents a total budget amount for an entity, then the set of interpolated input data 126 can reflect possible, approximate, or suggested values or percentages of that total funded amount that the interpolation engine 104 can allocate to various departments, using the interpolation function 140. Again, as noted the interpolation function 140 can be determined by interpolation engine 104 to generate the set of target output data 120, as predetermined by the user or otherwise known or fixed.

The following applications, scenarios, applications, or illustrative studies will illustrate the interpolation action or activity that may be performed by the interpolation engine 104, according to various embodiments. In cases, again merely for illustration of exemplary interpolation analytics, the set of operative data 118 can be or include data related to medical studies or information. Thus for instance, the set of operative data 118 can include data for a set or group of years that relate to public health issues or events, such as the population-based course of the influenza seasons over that interval. The set of operative data can include variables or inputs that were captured or tracked for the influenza infection rate in the population for each year over the given window. Those variables or inputs can be or include, for instance, the percentage of the population receiving a public vaccine by Week 10 of the flu season, e.g. 20%, the age cohorts of the patients receiving the vaccine, the strain of the influenza virus upon which the vaccine is based, e.g. H5N5, the infectivity or transmission rate for a given infected individual, e.g. 3%, the average length of infectious illness for the infected population, e.g. 10 days, and/or other variables, metrics, data or inputs related to the epidemiology of the study. In aspects, the output or result of those tracked variables can be the overall infection rate for the total population at peak or at a given week or other time point, such as 40%. Other outputs or results can be selected. Those inputs and output(s) can be recorded in the set of operative data 118 for a set or group of years, such as for each year of 2000-2009, or other periods. In aspects, data so constituted can be accessed and analyzed, to generate interpolated data for current year 2010, although the comparable current inputs are not known or yet collected. In the current year (assumed to be 2010), one or more of the set of predetermined variables 124 may be known, such as, for instance, the vaccination rate of because yearly stocks are known or can be reliably projected, e.g. at 25%. In addition, an analyst or other user may specify a set of target output data 120 that can include the overall infection rate for the population the year under study, such as 35% at peak. In cases of this illustrative type, the interpolation engine 104 can access or receive the overall infection rate (35% peak) as the set of predetermined output data 120 or a part of that data, as well as the vaccination rate (25%) as the set of predetermined input data 124 or part of that data. In aspects, the interpolation engine 104 can access the collected historical data (for years 2000-2009) to analyze that data, and generate an interpolation function 140 which operates on the recorded inputs to produce the historical outputs (overall infection rate), for those prior years, either to exact precision, approximate precision, and/or to within specified margins or tolerance. The interpolation engine 104 can then access or receive the set of target output data 120 for the current (2010) year (35% peak infection), the set of predetermined input data (25% vaccination rate), and/or other variables or data, and utilize the interpolation function 140 to generate the set of interpolated input data 126. In the described scenario, the set of interpolated input data 126 generated or produced by the interpolation engine 104 can include the remaining unknown, speculative, uncollected, or otherwise unspecified inputs, such as the percentage of the population receiving a public vaccine by Week 10 of the flu season, e.g. 25%, the age cohorts of the patients receiving the vaccine, the strain of the influenza virus upon which the vaccine is based, e.g. H1N5, the infectivity or transmission rate for a given infected individual, e.g. 4%, the average length of infectious illness for the infected population, e.g. 9 days, and/or other variables, metrics, data or inputs. In aspects, the interpolation engine 104 can generate or decompose the set of interpolated input data 126 to produce the set of target output data 120 (here 35% peak infection) to exact or arbitrary precision, and/or to within a specified margin or tolerate, such as 1%. Other inputs, outputs, applications, data, ratios and functions can be used or analyzed using the systems and techniques of the present teachings.

In embodiments, as noted the interpolation function 140 can be generated by the interpolation engine 104 by examining the same or similar variables present in the set of operative data 118, for instance, medical data as described, or the total fiscal data for a government agency or corporation for a prior year or years. In such cases, the interpolation engine 104 can generate the interpolation function 140 by assigning the same or similar categories of variables a similar value as the average of prior years or sets of values for those same variables, and then perform an analytic process of those inputs to derive set of target output data 120 as currently presented. The interpolation engine 104 can, for example, apply a random perturbation analysis to the same variables from prior years, to produce deviations in amount for each input whose value is unknown and desired to be interpolated. When combinations of the set of predetermined input data 124 and set of interpolated input data 126 are found which produce the set of target output data 120, or an output within a selected margin of set of target output data 120, the user can operate the selection dialog 112 or otherwise respond to accept or fix those recommended or generated values.

In cases, and as for instance illustrated in FIG. 2B, the set of combined input data 122 can be generated to produce the set of target output data 120 may not be unique, as different combinations of the set of predetermined input data 124 and set of interpolated input data 126 can be discovered to produce the set of target output data 120 either exactly, or to within specified tolerance. In such cases, different versions, generations, and/or series of set of combined input data 122 can be generated that will produce the set of target output data 120 to equal or approximately equal tolerance. For example, in cases where the set of operative data 118 relates to an epidemiological study; it may be found that a limit of 20 million cases of new infection during a flu season can be produced as the set of target output data 120 by applying 40 million doses of vaccine at week 6 of the influenza season, or can be produced as a limit by applying 70 million doses of vaccine at week 12 of the same influenza season. Other variables, operative data, ratios, balances, interpolated inputs, and outputs can be used or discovered. In embodiments as noted and as shown in FIG. 2C, when the possible conformal set of interpolated inputs 126 is not unique, the interpolation engine 104 can generate a set of interpolated series 128, each series containing a set of interpolated input data 126 which is different and contains potentially different interpolated inputs from other conformal data sets in the series of interpolated input sets 128. In cases where such alternatives exist, the interpolation engine 104 can generate and present the series of interpolated input sets 128, for instance, in series-by-series graphical representations or otherwise, to select, compare, and/or manipulate the results and values of those respective data sets. In embodiments, the analyst or other user may be given a selection or opportunity to choose one set of interpolated input data 126 out of the series of interpolated input sets 128 for use in their intended application, or can, in embodiments, be presented with options to continue to analyze and interpolate the set of operative data 118, for example to generate new series in the series of interpolated input sets 128. Other processing options, stages, and outcome selections are possible.

Figure 3:
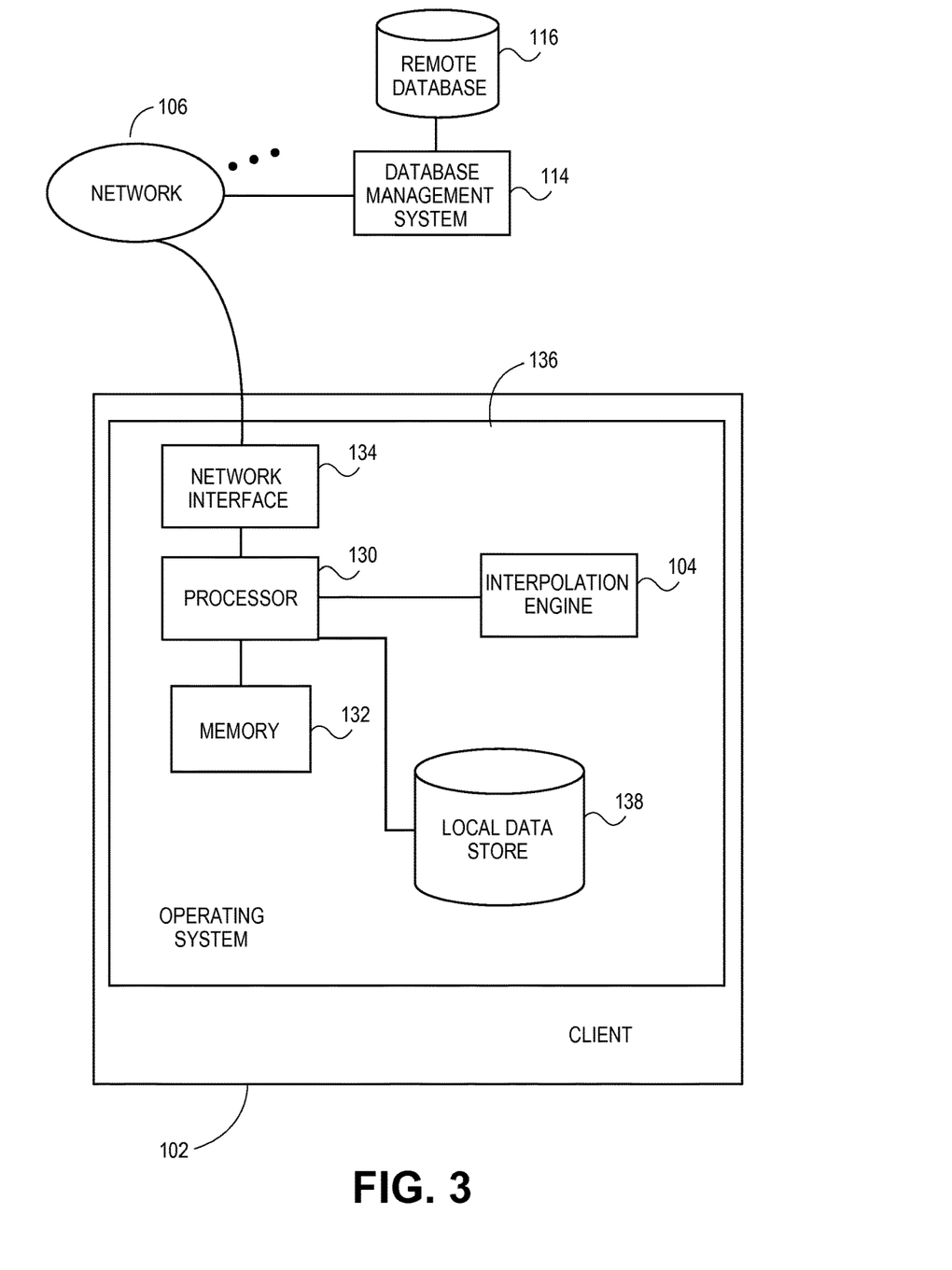
FIG. 3 illustrates an exemplary hardware configuration for client machine which can host or access systems and methods for interpolating conformal input sets based on a target output, according to various embodiments.

FIG. 3 illustrates an exemplary diagram of hardware and other resources that can be incorporated in a client 102 that can host or be used in connection with systems and methods for interpolating conformal input sets based on a target output, according to embodiments. In aspects, the client 102 can be or include a personal computer, a network enabled cellular telephone, or other networked computer, machine, or device. In embodiments as shown, the client 102 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 can also communicate with the interpolation engine 104 and/or a local data store 138, such as a database stored on a local hard drive. Processor 130 further communicates with network interface 134, such as an Ethernet or wireless data connection, which in turn communicates with one or more networks 106, such as the Internet or other public or private networks. Processor 130 also communicates with database management system 114 and/or remote database 116, such as an Oracle™ or other database system or platform, to access set of operative data 118 and/or other data stores or information. Other configurations of client 102, associated network connections, storage, and other hardware and software resources are possible. In aspects, the database management system 114 and/or other platforms can be or include a computer system comprising the same or similar components as the client 102, or can comprise different hardware and software resources.

Figure 4:
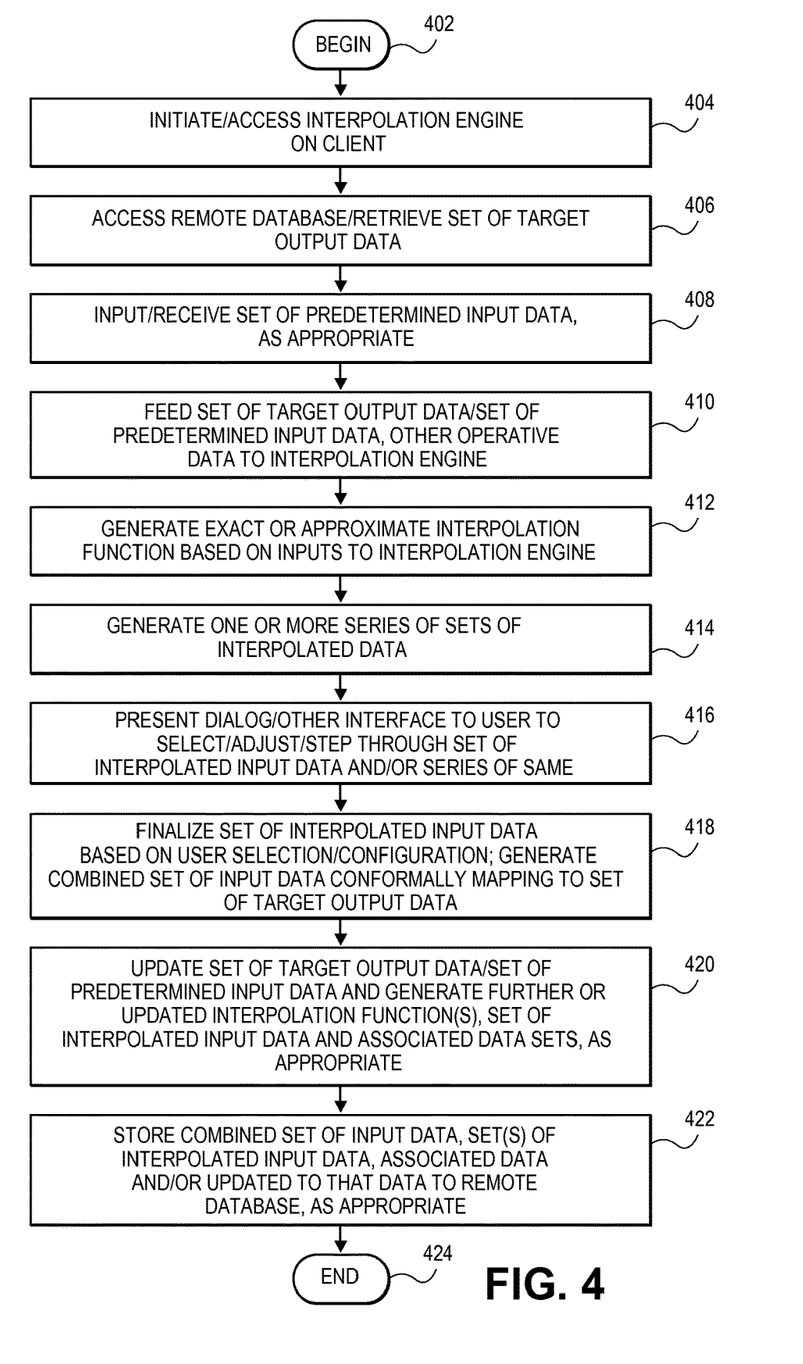
FIG. 4 illustrates a flowchart for overall interpolation, function determination, and other processing that can be used in systems and methods for interpolating conformal input sets based on a target output, according to various embodiments.

FIG. 4 illustrates a flowchart of overall processing to generate interpolation functions, sets of interpolated data, and other reports or information, according to various embodiments of the present teachings. In 402, processing can begin. In 404, a user can initiate and/or access the interpolation engine 104 on client 102, and/or through other devices, hardware, or services. In 406, the user can access the remote database 116 via the database management system 114 and retrieve the set of target output data 120 and/or other associated data or information. In 408, the interpolation engine 104 can input or receive the set of predetermined input data 124, as appropriate. In embodiments, the set of predetermined input data 124 can be received via a selection dialog 112 from the user or operator of client 102. In embodiments, the set of predetermined input data 124 can in addition or instead be retrieved from the set of operative data 116 stored in remote database 116, and/or other local or remote storage or sources. In aspects, the set of predetermined input data 124 can be or include data that is already known or predetermined, which has a precise target value, or whose value is otherwise fixed. For instance, in cases where the set of operative data 118 relates to an undersea oil reserve in a hydrology study, the total volume of oil stored in a reservoir can be known or fixed, and supplied as part of the set of predetermined input data 124 by the user or by retrieval from a local or remote database. In 410, the set of target output data 120, the set of predetermined input data 124, and/or other data in set of operative data 118 or other associated data can be fed to interpolation engine 104.

In 412, the interpolation engine 104 can generate the interpolation function 140 as an exact or approximate function that will generate output conforming to the set of target output data 120, as an output. In aspects, the interpolation function 140 can be generated using techniques such as, for instance, perturbation analysis, curve fitting analysis, other statistical analysis, linear programming, and/or other analytic techniques. In aspects, the interpolation function 140 can be generated to produce an approximation to the set of target output data 120, or can be generated to generate an approximation to set of target output data 120 to within an arbitrary or specified tolerance. The interpolation function 140 can also, in aspects, be generated to produce set of target output data 120 with the highest degree of available accuracy. In 414, the interpolation engine 104 can generate one or more subsets of interpolated input data 126, and/or one or more set of interpolated series 128 containing individual different combinations of subsets of interpolated input data 126. In aspects, the set of interpolated input data 126 and/or series of interpolated input sets 128 can be generated by applying the set of target output data 120 to the set of predetermined input data 124 and filling in values in the set of interpolated input data 126 which produce an output which conforms to the set of target output data 120, exactly or to within a specified tolerance range. In aspects, the set of interpolated input data 126 and/or series of interpolated input sets 128 can be generated by producing sets of possible interpolated inputs which are then presented to the user via the selection dialog 112, for instance to permit the user to accept, decline, or modify the values of set of interpolated input data 126 and/or series of interpolated input sets 128.

In 416, the interpolation engine 104 can present the selection dialog 112 to the user to select, adjust, step through, and/or otherwise manipulate the set of interpolated input data 126 and/or series of interpolated input sets 128, for instance to allow the user to view the effects or changing different interpolated input values in those data sets. For example, in a case where the set of operative data 118 relates to financial budgets for a corporation, the user may be permitted to manipulate the selection dialog 112 to reduce the funded budget amount for one department, resulting in or allowing an increase in the budget amounts for a second department or to permit greater investment in IT (information technology) upgrades in a third department. In aspects, the selection dialog 112 can permit the adjustment of the set of interpolated input data 126 and/or series of interpolated input sets 128 through different interface mechanisms, such as slider tools to slide the value of different interpolated inputs through desired ranges. In 418, the user can finalize the set of interpolated input data 126, and the interpolation engine 104 can generate the resulting combined set of input data 122 which conformally maps to the set of target output data 120. In 420, the set of target output data 120, set of predetermined input data 124, and/or other information related to the set of operational data 116 and the analytic systems or phenomena being analyzed can be updated. The interpolation engine 104 and/or other logic can generate a further or updated interpolation function 140, a further or updated set of interpolated input data 126, and/or an update to other associated data sets in response to any such update to the set of target output data 120 and/or set of predetermined input data 124, as appropriate. In 422, the combined set of input data 122, the set of interpolated input data 126, the series of interpolated input sets 128, the interpolation function 140, and/or associated data or information can be stored to the set of operative data 118 in the remote database 116, and/or to other local or remote storage. In 424, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the interpolation engine 104 comprises a single application or set of hosted logic in one client 102, in embodiments the interpolation and associated logic can be distributed among multiple local or remote clients or systems. In embodiments, multiple interpolation engines can be used. Similarly, while embodiments have been described in which the set of operative data 118 is accessed via one remote database management system 114 and/or a remote database 116 associated with the remote database management system 114, in embodiments, the set of operative data 118 and associated information can be stored in one or multiple other data stores or resources, including in local data store 138 of client 102. Other resources described as singular or integrated can in embodiments be plural or distributed, and resources described as multiple or distributed can in embodiments be combined. The scope of the invention is accordingly intended to be limited only by the following claims.

What is claimed:
1. A method comprising:
receiving, by a processor, input data for a computational modeling engine, wherein the input data comprises a set of inputs that is absent at least one input;

retrieving, by the processor, target output data for the computational modeling engine;

executing, by the processor, an interpolation function in view of the target output data to generate interpolated input data, wherein the interpolated input data comprises alternative sets of interpolated input data that each comprise a value for the at least one input;

displaying a user interface that comprises graphical representations of the alternative sets of the interpolated input data and enables adjustment of the interpolated input data;

receiving user input to select one of the alternative sets and to adjust the interpolated input data comprising the value of the selected alternative set; and storing, by the processor, the value for the at least one input from the selected alternative set with the input data for the computational modeling engine.

2. The method of claim 1, further comprising:

receiving the adjusted interpolated input data; and combining the adjusted interpolated input data and the interpolated input data to generate a combination, wherein the combination of the adjusted interpolated input data and interpolated input data comprises at least one of a set of financial data, a set of medical data, a set of demographic data, a set of engineering data, a set of network operations data, or a set of geographic data, and wherein adjusting the interpolated input data comprises changing values of the interpolated input data via the user interface and generating and presenting different sets of the interpolated input data on the user interface in view of the changed values of the interpolated operative input data.

3. The method of claim 1, wherein the input data of the computational modeling engine comprises first input data and second input data and wherein the target output data comprises first output data corresponding to the first input data and second output data corresponding to the second input data.

4. The method of claim 3, further comprising determining the interpolation function, wherein determining the interpolation function comprises generating an average of ratios in view of operative input data and operative output data and wherein generating interpolated input data comprises generating the interpolated input data in view of the average of ratios.

5. The method of claim 4, wherein determining the interpolation function further comprises determining a set of alternative interpolation functions of different orders.

6. The method of claim 1, further comprising generating a dialog element to present a user with the interpolated input data for acceptance or selection.

7. The method of claim 6, wherein the generating the dialog element comprises generating the dialog element on a client machine operated by the user.

8. The method of claim 1, wherein the combination of the adjusted interpolated input data and the interpolated input data conformally maps to the target output data of the computational modeling engine.

9. A system comprising:
a memory; and
a processor, operably coupled to the memory, the processor to:

receive input data for a computational modeling engine, wherein the input data comprises a set of inputs that is absent at least one input;

retrieving target output data for the computational modeling engine;

executing an interpolation function in view of the target output data to generate interpolated input data, wherein the interpolated input data comprises alternative sets of interpolated input data that each comprise a value for the at least one input;

display a user interface that comprises graphical representations of the alternative sets of the interpolated input data and enables adjustment of the interpolated input data;

receive user input to select one of the alternative sets and to adjust the interpolated input data comprising the value of the selected alternative set; and store, by the processor, the value for the at least one input from the selected alternative set with the input data for the computational modeling engine.

10. The system of claim 9, wherein the combination of the adjusted interpolated input data and the interpolated input data conformally maps to the target output data of the computational modeling engine.

11. The system of claim 9, wherein the processor is to generate a dialog element to present a user with the interpolated input data for acceptance or selection.

12. The system of claim 11, wherein the processor is to generate the dialog element by generating the dialog element on a client machine operated by the user.

13. The system of claim 9, wherein the processor is further to receive the adjusted interpolated input data, and combine the adjusted interpolated input data and the interpolated input data to generate a combination, wherein the combination of the adjusted interpolated input data and interpolated input data comprises at least one of a set of financial data, a set of medical data, a set of demographic data, a set of engineering data, a set of network operations data, or a set of geographic data, and wherein to adjust the interpolated input data, the processor is further to change values of the interpolated input data via the user interface, and to generate and present different sets of the interpolated input data on the user interface in view of the changed values of the interpolated input data.

14. The system of claim 9, wherein the input data of the computational modeling engine comprises first input data and second input data and wherein the target output data comprises first output data corresponding to the first input data and second output data corresponding to the second input data.

15. The system of claim 14, wherein the processor is further to generate an average of ratios in view of operative input data and operative output data and wherein to generate interpolated input data is to generate interpolated input in view of the average of ratios.

* * * * *